United States Patent
Nebel et al.

(10) Patent No.: US 7,289,571 B1
(45) Date of Patent: Oct. 30, 2007

(54) METHOD FOR CONTACTLESS DATA TRANSMISSION AND TRANSPONDER FOR A CONTACTLESS DATA TRANSMISSION SYSTEM

(75) Inventors: Gerhard Nebel, Immenstadt (DE); Gerhard Schraud, Mering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/890,147

(22) PCT Filed: Jan. 13, 2000

(86) PCT No.: PCT/EP00/00242

§ 371 (c)(1),
(2), (4) Date: Jul. 26, 2001

(87) PCT Pub. No.: WO00/45329

PCT Pub. Date: Aug. 3, 2000

(30) Foreign Application Priority Data

Jan. 29, 1999 (EP) ................................. 99101577

(51) Int. Cl.
*H04L 27/04* (2006.01)
(52) U.S. Cl. ..................................... 375/295
(58) Field of Classification Search ............... 375/211, 375/212, 219, 220, 258, 295, 316, 340; 340/572.1, 340/10.34, 10.4; 455/7, 17
See application file for complete search history.

(56) References Cited

U.S. PATENT DOCUMENTS

| 5,548,291 A | * | 8/1996 | Meier et al. | ............. | 340/10.34 |
| 6,028,503 A | * | 2/2000 | Preishuberpflugl et al. | .............. | 340/10.4 |
| 6,342,844 B1 | * | 1/2002 | Rozin | ......................... | 340/933 |
| 6,362,738 B1 | * | 3/2002 | Vega | ....................... | 340/572.1 |

FOREIGN PATENT DOCUMENTS

| EP | 0 473 569 B1 | 8/1991 |
| FR | 2751148 | 7/1996 |
| WO | 99/42948 | 8/1999 |

OTHER PUBLICATIONS

Patent Abstracts of Japan 04 205586.

* cited by examiner

*Primary Examiner*—Don N. Vo
(74) *Attorney, Agent, or Firm*—Morrison & Foerster LLP

(57) ABSTRACT

A system and method for contactless data transmission. A transponder includes a reception unit for receiving a modulated RF signal, a signal processing unit which is connected downstream of the reception unit and a unit for processing at least two differently modulated and/or coded RF signals, for providing a supply voltage and for providing a data signal produced from the modulated RF signal, and a data processing unit which can be connected to the supply voltage and to which the data signal can be supplied, and which is connected to the signal processing unit for setting the modulation type and/or coding type for the RF signals to be processed. The signal processing unit is set to the process differently modulated and/or coded RF signals in chronological order, starting from application of a supply voltage until the data processing unit identifies reception of a prescribed data signal.

21 Claims, 2 Drawing Sheets

METHOD FOR CONTACTLESS DATA TRANSMISSION AND TRANSPONDER FOR A CONTACTLESS DATA TRANSMISSION SYSTEM

CLAIM FOR PRIORITY

This application claims priority to International Application No. PCT/EP00/00242 which was published in the German language on Jan. 13, 2000.

TECHNICAL FIELD OF THE INVENTION

The present invention relates to a method for contactless data transmission, and in particular, to contactless data transmission between a transponder and a read/write station.

BACKGROUND OF THE INVENTION

Data transmission between a transponder, such as a smart card, and a read/write station already has existing standards, such as ISO 14443, some of which are still being worked on. These standards regulate, among other things, the modulation type for the RF signals transmitted between the card and the read/write station, the carrier frequency for said RF signals and the coding of the transmitted data.

The standard ISO 14443 provides for data transmission to involve the use of RF signals onto which the data to be transmitted are modulated on the basis of ASK modulation (ASK=amplitude shift keying). In this context, the RF signal alternates between an upper and a lower amplitude value on the basis of the data signal to be transmitted. Two modulation methods are provided whose signals respectively have differing degrees of modulation. In this context, the degree of modulation is calculated from the quotient between the difference and the sum of the upper and lower amplitude values. In the case of "ASK100% modulation", which is also called hard keying or on-off keying, the lower amplitude is zero, the degree of modulation is thus 100%, and the RF signal is thus fully turned off on the basis of the data signal. In another method, which has the working title ASK10%, the degree of modulation is between 5% and 15%, and the lower amplitude value is thus between approximately 74% and 90% of the upper amplitude value. As compared with ASK100% modulation, ASK10% modulation has the advantage that the spectrum of the signals to be transmitted has a narrower bandwidth, but it has the drawback of greater susceptibility to interference, and hence of a shorter possible transmission distance between the read/write station and the transponder.

To process the modulated energy signal, known smart cards have the following components: a receiver for receiving the modulated RF signal, a signal processing unit connected downstream of the receiver for obtaining the data signal from the RF signal using demodulation and decoding, and a data processing unit to which the data signal can be supplied.

Besides transmission of the modulated data signal, the RF signal is used for supplying voltage to the smart card. To this end, the RF signal is rectified in the signal processing unit and is supplied to a voltage regulating arrangement which corrects fluctuations in the received power of the RF signal in order to make available a supply voltage which is as constant as possible.

A drawback is that voltage regulators for producing a supply voltage from an ASK10% modulated signal and voltage regulators for producing a supply voltage from an ASK100% modulated signal are not compatible. In particular, a regulator for ASK10% is not suitable for processing signals from ASK100% modulation. With this modulation type, signal pauses arise, whereas ASK10% modulation involves a reduction in the signal amplitude to a minimum of 74%. The ASK10% regulator is not designed for such signal pauses and is not capable of reliably maintaining the supply voltage on receiving ASK100% modulated RF signals.

Hence, the only methods for contactless data transmission which are known to date are those in which the transponder is capable of processing RF signals modulated on the basis of one of the modulation types ASK100% or ASK10%. If the transponder is provided with circuit measures for differently modulated and/or coded RF signals, the particular problem which arises is that of identifying the modulation and/or coding type for the received RF signals and of setting the transponder to process the identified signal.

SUMMARY OF THE INVENTION

In one embodiment of the invention, there is a method for contactless data transmission. The method includes, for example, receiving a modulated RF signal at a reception unit; processing one of at least two differently modulated and coded RF signals using a signal processor unit to provide a supply voltage and a data signal produced from the modulated RF signal; and supplying the data signal to a data processing unit to the supply voltage configured for connection and to the signal processing unit to set at least one of the modulation type and coding type for the RF signals to be processed, the signal processing unit configured to process at least one of differently modulated and coded RF signals in chronological order, starting from application of a supply voltage until the data processing unit identifies reception of a prescribed data signal.

In one aspect of the invention, a signal processing unit configured to process ASK10% modulated signals and ASK100% modulated signals.

In another aspect of the invention, a supply voltage is applied to the data processing unit, the signal processing unit is first set to the process ASK100% modulated signals.

In still another aspect of the invention, a prescribed data signal is a Request signal transmitted by a read/write unit at predetermined time intervals.

In yet another aspect of the invention, a signal processing unit is set to at least one of a modulation and coding type for respective prescribed time periods until the prescribed signal is detected, the time period being longer than the time interval between two Request signals.

In another aspect of the invention, a supply voltage is applied to the data processing unit, a counter begins to run from a defined start count, and the signal processing unit is set to at least one of another modulation type and coding type if the prescribed signal has not been identified when an end count is reached.

In still another aspect of the invention, a signal processing unit is cyclically set to at least one of different modulation types and coding types.

In yet another aspect of the invention, the modulation type and coding type are set by controlling demodulation and decoding units and voltage regulators in the signal processing unit.

In still another aspect of the invention, a software stored in the data processing unit controls the method.

In one embodiment of the invention, there is a transponder for a contactless inductive data transmission system. The system includes, for example, a reception unit to receive a modulated RF signal; a signal processing unit which is connected downstream of the reception unit and has a first output terminal pair to provide a supply voltage and has at least one second output terminal to provide a data signal obtained from the modulated RF signal, the signal processing unit having a device to process at least one of two differently modulated and coded RF signals; and a data processing unit which is connected to the output terminal pair of the signal processing unit and to which the data signal can be supplied, and having at least one first output terminal which is connected to the signal processing unit to set at least one of the modulation type and coding type for the signals to be processed.

In one aspect of the invention, the data processing unit has a counter, and the signal processing unit is configured to be controlled on the basis of the count.

In another aspect of the invention, the signal processing unit is configured to be controlled on the basis of detection of a prescribed data signal in the data processing unit.

In still another aspect of the invention, the prescribed data signal is a Request signal transmitted by a transmission unit to commence communication with the transponder.

In yet another aspect of the invention, the reception unit has an input resonant circuit and a rectifier.

In another aspect of the invention, the signal processing unit has a first and a second voltage regulator to provide the supply voltage, and a first and a second demodulation and decoding unit to provide the data signal.

In still another aspect of the invention, the first voltage regulator is designed to process modulated energy signals having a first degree of modulation, and the second voltage regulator is designed to process modulated energy signals having a second degree of modulation.

In yet another aspect of the invention, the first demodulation and decoding unit is designed to process modulated energy signals having a first degree of modulation, and the second demodulation and decoding unit is designed to process modulated energy signals having a second degree of modulation.

In another aspect of the invention, the modulation of the energy signals is ASK modulation, and the first degree of modulation is 100% and the second degree of modulation is less than 100%.

In another aspect of the invention, the first and second demodulation and decoding units are configured to be controlled via output terminals of the data processing unit.

In yet another aspect of the invention, the data processing unit has a microprocessor with a memory in which a program is stored.

In still another aspect of the invention, the memory is a ROM or EEPROM.

BRIEF DESCRIPTION OF THE DRAWINGS

The invention is explained in more detail below with the aid of exemplary embodiments in figures, in which.

DETAILED DESCRIPTION OF THE PREFERRED EMBODIMENTS

Figure 1:
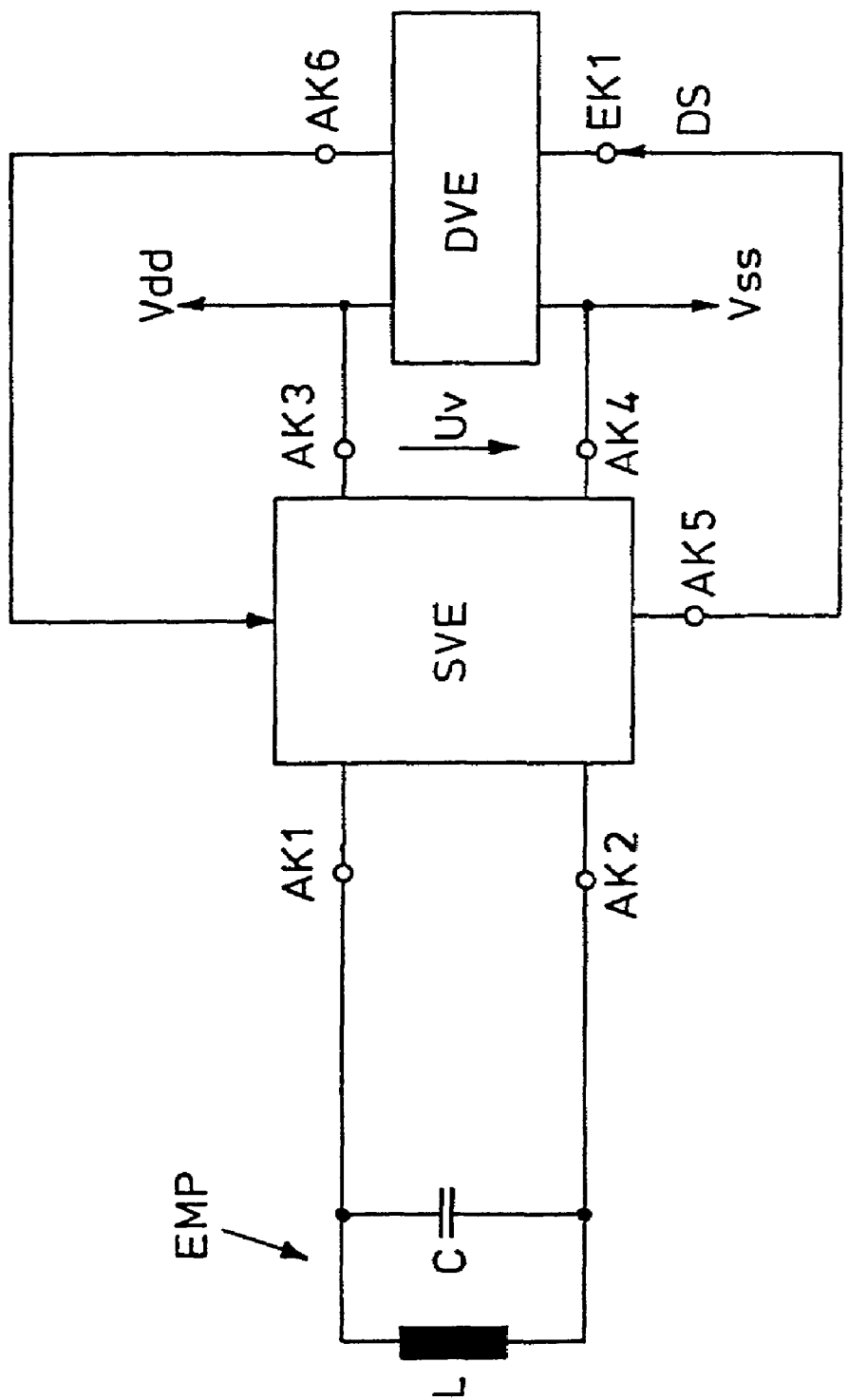
FIG. 1 shows a block diagram of the inventive transponder for carrying out the inventive method.

The present invention provides an improved contactless transmission method in which a transponder is capable of processing differently modulated and/or coded RF signals, in particular ASK100% and ASK10% modulated signals, so that the aforementioned drawbacks, in particular, do not arise.

In accordance with one embodiment of the invention, a transponder is provided which has the following features: a reception unit for receiving a modulated RF signal, and a signal processing unit which is connected downstream of the reception unit and has means for processing at least two differently modulated and/or coded RF signals, with a supply voltage being available on a first output terminal pair, and a data signal obtained from the RF signal being available on a second output terminal. According to the embodiment, a data processing unit is connected to the output terminal pair of the signal processing unit in order to supply voltage. In addition, the data processing unit is connected by an output terminal to the signal processing unit in order to control the latter and to set it to process differently modulated and/or coded RF signals.

As the supply voltage builds up, the data processing unit initially includes no information regarding the manner in which the RF signal which builds up the supply voltage is modulated and/or coded. For this purpose, when an RF signal is received and a supply voltage starts to build up on the data processing unit, the data processing unit is used to set the signal processing unit at preferably cyclical time intervals to the process differently modulated and/or coded RF signals until the data processing unit records the reception of a prescribed data signal. Reception of this prescribed data signal, which is preferably a Request signal agreed between the read/write station and the transponder, indicates to the data processing unit that the processing mode currently set on the signal processing unit is correct.

In one embodiment of the invention, the signal processing unit can be set to the process ASK10% modulated and ASK100% modulated signals, and the signal processing unit is first set to the process ASK100% modulated signals when a supply voltage is present. The signal processing unit preferably has dedicated a circuit unit, in particular demodulation and decoding units and voltage regulators, for each modulation and/or coding type for the RF signals to be processed. In this context, the signal processing unit is set to one of these modulation and/or coding types preferably by connecting the circuit unit which are required and disconnecting the circuit unit which are not required. The voltage regulator for ASK100% modulated signals is also capable of producing a supply voltage from an ASK10% modulated signal. The initial setting to the process ASK100% modulated signals thus ensures that the voltage supply to the data processing unit is also ensured when an ASK10% modulated RF signal is received. If a valid data signal is not identified by the data processing unit within a prescribed time, it is assumed that the received RF signal is an ASK10% modulated signal, and the signal processing unit is changed over to the process these signals.

The prescribed data signal to be identified by the data processing unit is preferably a "Request signal" transmitted by the read/write station at fixed time intervals for the purpose of contacting a transponder. The time intervals at which the data processing unit changes over the signal processing unit to another modulation and/or coding type until a valid data signal is identified are preferably longer than the time interval between two Request signals.

The invention also relates to a transponder for contactless data transmission in accordance with patent claims 10 to 21, and this transponder can be used to carry out the inventive method.

The inventive transponder has a reception unit for receiving a modulated RF signal, a signal processing unit which is connected downstream of the reception unit and has a first output terminal pair for providing a supply voltage and has at least one second output terminal for providing a data signal obtained from the modulated RF signal, the signal processing unit having means for processing at least two differently modulated and/or coded RF signals. In addition, the transponder has a data processing unit which is connected to the output terminal pair of the signal processing unit and to which the data signal can be supplied, and having at least one first output terminal which is connected to the signal processing unit for setting the modulation type and/or coding type for the signals to be processed.

The data processing unit is preferably in the form of a microprocessor having a microprogram stored in a ROM or EEPROM in order to control the signal processing unit. If the signal processing unit is designed such that circuit means for processing a multiplicity of differently modulated and/or coded RF signals are provided, then this embodiment affords the advantage that the transponder can be configured to the process selected RF signals using software. The same hardware design for the transponder can then be used for different transmission methods.

FIG. 1 shows the schematic design of a transponder for carrying out the inventive method.

The transponder has a reception unit EMP having an input resonant circuit comprising a coil L and a parallel capacitance C for receiving an RF signal onto which a data signal is modulated. Connected to output terminals AK1, AK2 of the reception unit EMP is a signal processing unit SVE which is used for providing a supply voltage Uv on an output terminal pair AK3, AK4 and for providing a data signal DS, obtained from the RF signal, on a second output terminal AK5. A data processing unit DVE is connected to the output terminal pair AK3, AK4 for the purpose of supplying voltage. In addition, the data processing unit DVE can be supplied with the data signal DS on an input terminal.

The signal processing unit is designed to process at least two differently modulated and/or coded RF signals, that is to say to derive a supply voltage from the RF signal and to obtain a data signal DS from the RF signal by demodulation and decoding. The signal processing unit SVE is connected to an output terminal AK6 of the data processing unit DVE. The data processing unit DVE uses this connection to set the modulation type and/or the coding type for the RF signals to be processed in the signal processing unit SVE.

Figure 2:
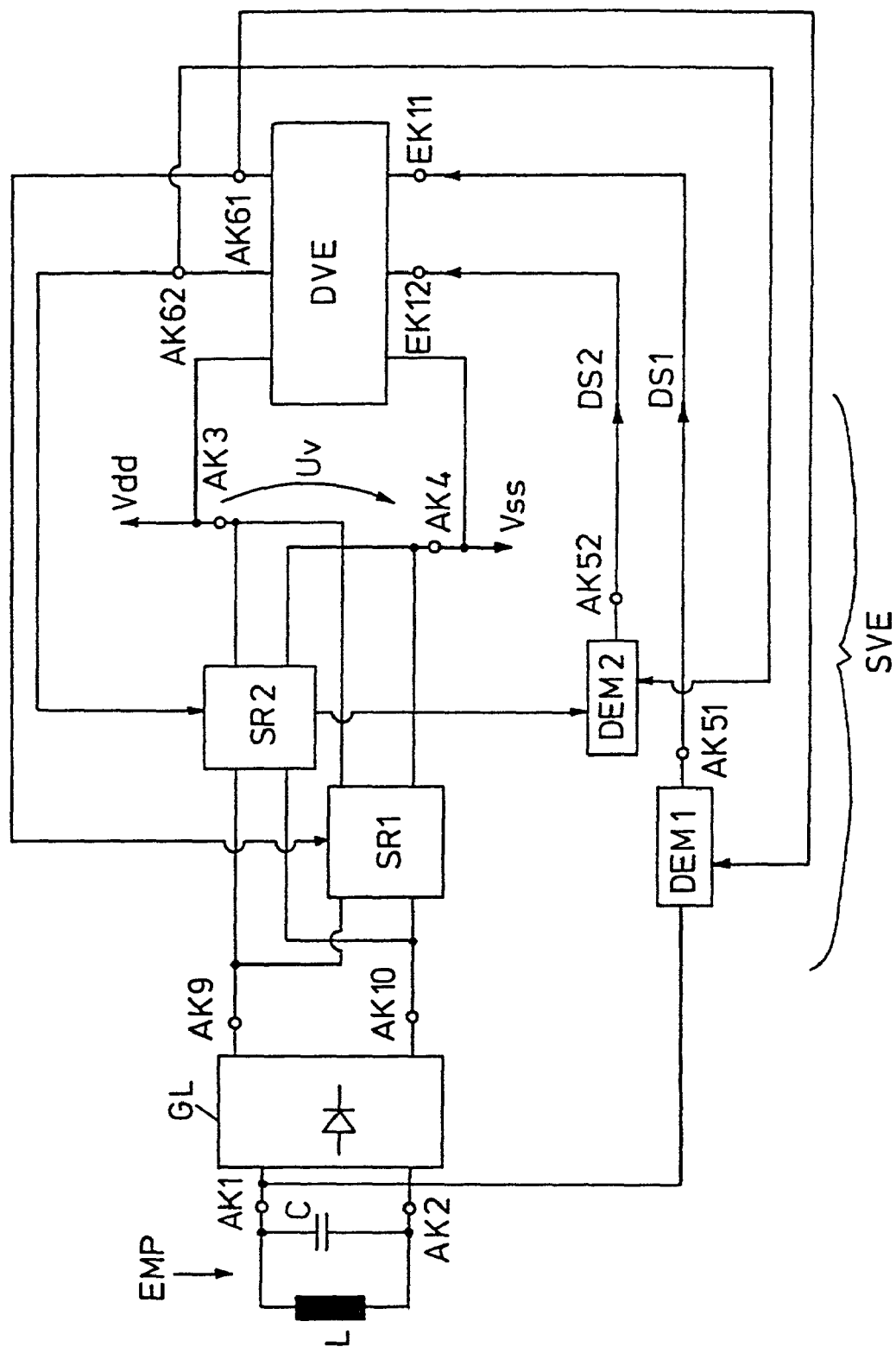
FIG. 2 shows a block diagram of the inventive transponder with an illustration of the schematic design of the signal processing unit.

In addition, FIG. 2 shows, schematically, the internal design of a signal processing unit SVE which is designed for processing at least two differently modulated and/or coded signals, in particular for processing ASK100% modulated signals and ASK10% modulated signals. The signal processing unit SVE has a rectifier GL which is connected to the output terminals AK1, AK2 of the reception unit EMP and has a first and a second voltage regulator SR1, SR2 connected downstream of it at output terminals AK9, AK10, the voltage regulators SR1, SR2 being connected in parallel. In this case, output terminals of the voltage regulators SR1, SR2 are connected to the output terminals AK3, AK4 of the signal processing unit SVE in order to provide the supply voltage Uv.

In this context, the first voltage regulator SR1 is used to provide the supply voltage Uv from a signal modulated in a first manner, in particular from an ASK100% modulated signal, and the second voltage regulator is used to provide the supply voltage from a signal modulated in a second manner, in particular from an ASK10% modulated signal. The voltage regulators SR1, SR2 can be controlled, in particular connected and disconnected, via output terminals AK61, AK62 of the data processing unit DVE. In this case, preferably the voltage regulator SR1; SR2 which is suitable for processing the RF signal to be received is active.

The signal processing unit SVE also has a first demodulation and decoding unit DEM1 and a second demodulation and decoding unit DEM2. In this context, the first demodulation and decoding unit DEM1 is designed for demodulating a signal modulated in a first manner, in particular an ASK100% modulated signal, and the second demodulation and decoding unit DEM2 is designed for demodulating a signal modulated in a second manner, in particular an ASK10% modulated signal. The demodulation and decoding units DEM1, DEM2 also decode the received demodulated RF signals, it being assumed in the present example that the differently modulated signals are differently coded, so that a decoder is provided in each demodulation and decoding unit DEM1, DEM2. If the data signals modulated onto the RF signals are coded in the same manner but are modulated on in different manners, the demodulation and decoding units DEM1, DEM2 could have one decoder available jointly.

The first demodulation and decoding unit DEM1, which is suitable for demodulating ASK100% modulated signals, is connected to the output terminal AK1 of the receiver. In this case, such signals are demodulated by counting the received signal oscillations and recording the signal pauses. The second demodulation and decoding unit DEM2, which is suitable for demodulating ASK10% modulated signals, is connected to an output terminal of the voltage regulator SR2. For this modulation type, demodulation is performed by recording current fluctuations in the voltage regulator SR2 which are caused by the data signals modulated on.

Output terminals AK51, AK52 of the demodulation and decoding units DEM1, DEM2 are connected to input terminals EK11, EK12 for supplying a data signal DS1, DS2 obtained from the RF signal by demodulation and decoding. The demodulation and decoding units DEM1, DEM2 can be controlled via the output terminals AK61, AKG2 of the data processing unit DVE, these output terminals AK61, AK62 preferably being used to activate only the demodulation and decoding unit DEM1; DEM2 which is required for processing the signal to be received.

For the transponder shown, the signal processing unit SVE is controlled by the data processing unit using the inventive method in the manner explained below.

If the transponder is placed into the transmission range of a read/write station transmitting RF signals and an RF signal is received by the receiver, a supply voltage starts to build up between the output terminals AK3, AK4 of the signal processing unit. In this case, one or both voltage regulators SR1, SR2 can be active. When a supply voltage Uv is applied to the data processing unit DVE, the latter is activated and controls the signal processing unit SVE such that an RF signal modulated and/or coded in one manner can be processed. This is preferably done by disconnecting the voltage regulator SR1; SR2 and the demodulation and decoding unit DEM1; DEM2, which are not required for processing the expected signal. In this case, the signal processing unit is preferably first set to process an ASK100% modulated RF signal by activating the first voltage regulator SR1 and the first demodulation and decoding unit DEM1. The first voltage regulator SR1, which is designed for processing ASK100% modulated signals, is also capable of making a supply voltage available from an ASK10% modulated signal, so that the supply voltage for the data processing unit DVE is also ensured if an ASK10% modulated signal is received while the signal processing unit is set to process ASK100% modulated signals. However, the demodulation and decoding units DEM1, DEM2 are not designed to process RF signals of the respective other modulation and/or coding type.

If the data processing unit DVE does not receive a valid data signal within a prescribed time period, which signal is, in particular, a Request signal from a read/write station, the data processing unit DVE changes over the signal processing unit SVE to process an RF signal modulated in another manner, in the present example to process an ASK10% modulated signal, since it is then assumed that the modulation type and/or coding type which is set is not correct. In this context, the time period after which changeover occurs is preferably greater than the time period between two Request signals, in order to ensure that such a signal has actually been transmitted during the waiting time of the data processing unit DVE.

Changeover to the respective other modulation and/or coding type is preferably effected at cyclical time intervals until a valid data signal is received by the data processing unit. If such a signal is received, it is certain that the modulation and/or coding type which is set is correct. The transponder can then reply to the read/write station using a transmission unit (not shown in more detail), in order to start data transmission.

In this context, the number of possible modulation and/or coding types for the RF signals which can be processed using the inventive transponder and the inventive method is in no way limited to two. Instead, the signal processing unit may include a circuit unit, in particular voltage regulators and demodulation and decoding units, for a multiplicity of differently modulated and/or coded RF signals.

The data processing unit DVE is, in particular, in the form of a microprocessor whose program is stored in a ROM or EEPROM. The transponder can thus be configured for various purposes with an identical hardware design, in particular with an identical design for the signal processing unit SVE. If, by way of example, the transponder is intended to start communicating with a read/write station when an ASK10% modulated RF signal is received, it is possible to use pure software measures to prevent ASK100% modulated signals from being processed. This embodiment additionally affords the advantage that the way in which the transponder works can be changed at a later time by means of a pure software change, which keeps down the cost and time involvement.

The data processing unit DVE preferably includes a comparator for comparing the data signals DS, DS1, DS2 with a desired signal. When a supply voltage Uv is applied to the data processing unit, the computer is set to a start count and is started. If, by the time an end count is reached, the comparator has not delivered a result such that a desired signal corresponding to an expected valid data signal has been received, the signal processing unit is changed over and the counter is set to the start count again. In this case, the signal processing unit SVE is preferably changed over cyclically until the comparator indicates reception of a valid signal.

What is claimed is:

1. A method for contactless data transmission, comprising:
    receiving a modulated RF signal at a reception unit;
    processing one of at least two differently modulated and coded RF signals using a signal processor unit to provide a supply voltage and a data signal produced from the modulated RF signal; and
    supplying the data signal to a data processing unit to the supply voltage configured for connection and to the signal processing unit to set at least one of the modulation type and coding type for the RF signals to be processed,
    the signal processing unit configured to process at least one of differently modulated and coded RF signals in chronological order, starting from application of a supply voltage until the data processing unit identifies reception of a prescribed data signal.

2. The method as claimed in claim 1, wherein the signal processing unit configured to process ASK10% modulated signals and ASK100% modulated signals.

3. The method as claimed in claim 2, wherein when a supply voltage is applied to the data processing unit, the signal processing unit is first set to the process ASK100% modulated signals.

4. The method as claimed in claim 1, wherein the prescribed data signal is a Request signal transmitted by a readwrite unit at predetermined time intervals.

5. The method as claimed in claim 1, wherein the signal processing unit is set to at least one of a modulation and coding type for respective prescribed time periods until the prescribed signal is detected, the time period being longer than the time interval between two Request signals.

6. The method as claimed in claim 1, wherein when a supply voltage is applied to the data processing unit, a counter begins to run from a defined start count, and the signal processing unit is set to at least one of another modulation type and coding type if the prescribed signal has not been identified when an end count is reached.

7. The method as claimed in claim 1, wherein the signal processing unit is cyclically set to at least one of different modulation types and coding types.

8. The method as claimed in claim 1, wherein at least one of the modulation type and coding type are set by controlling demodulation and decoding units and voltage regulators in the signal processing unit.

9. A computer-readable medium containing instructions for causing a computer to control the processing of an RF signal by a method comprising:
    receiving a modulated RF signal at a reception unit;
    processing one of at least two differently modulated and coded RF signals using a signal processor unit to provide a supply voltage and a data signal produced from the modulated RF signal; and
    supplying the data signal to a data processing unit to the supply voltage configured for connection and to the signal processing unit to set at least one of the modulation type and coding type for the RF signals to be processed,
    the signal processing unit configured to process at least one of differently modulated and coded RF signals in chronological order, starting from application of a supply voltage until the data processing unit identifies reception of a prescribed data signal.

10. A transponder for a contactless inductive data transmission system, comprising:
- a reception unit to receive a modulated RF signal;
- a signal processing unit which is connected downstream of the reception unit and has a first output terminal pair to provide a supply voltage and has at least one second output terminal to provide a data signal obtained from the modulated RF signal, the signal processing unit having a device to process at least one of two differently modulated and coded RF signals; and
- a data processing unit which is connected to the output terminal pair of the signal processing unit and to which the data signal is supplied, and having at least one first output terminal which is connected to the signal processing unit to set at least one of the modulation type and coding type for the signals to be processed.

11. The transponder as claimed in claim 10, wherein the data processing unit has a counter, and the signal processing unit is configured to be controlled on the basis of the count.

12. The transponder as claimed in claim 10, wherein the signal processing unit is configured to be controlled on the basis of detection of a prescribed data signal in the data processing unit.

13. The transponder as claimed in claim 12, wherein the prescribed data signal is a Request signal transmitted by a transmission unit to commence communication with the transponder.

14. The transponder as claimed in claim 10, wherein the reception unit has an input resonant circuit and a rectifier.

15. The transponder as claimed in claim 10, wherein the signal processing unit has a first and a second voltage regulator to provide the supply voltage, and a first and a second demodulation and decoding unit to provide the data signal.

16. The transponder as claimed in claim 10, wherein the first voltage regulator is designed to process modulated energy signals having a first degree of modulation, and
- the second voltage regulator is designed to process modulated energy signals having a second degree of modulation.

17. The transponder as claimed in claim 15, wherein the first demodulation and decoding unit is designed to process modulated energy signals having a first degree of modulation, and the second demodulation and decoding unit is designed to process modulated energy signals having a second degree of modulation.

18. The transponder as claimed in claim 17, wherein the modulation of the energy signals is ASK modulation, and the first degree of modulation is 100% and the second degree of modulation is less than 100%.

19. The transponder as claimed in claim 15, wherein the first and second demodulation and decoding units are configured to be controlled via output terminals of the data processing unit.

20. The transponder as claimed in claim 10, wherein the data processing unit has a microprocessor with a memory in which a program is stored.

21. The transponder as claimed in claim 20, wherein the memory is a ROM or EEPROM.

* * * * *